(12) United States Patent
Roeters et al.

(10) Patent No.: US 6,431,623 B1
(45) Date of Patent: Aug. 13, 2002

(54) VACUUM DEVICE FOR PEELING OFF THIN SHEETS

(75) Inventors: Glen Roeters, Huntington Beach; Boris Moldavsky, Irvine, both of CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/330,368

(22) Filed: Jun. 11, 1999

(51) Int. Cl.$^7$ ................................................ B66C 1/02
(52) U.S. Cl. ........................ 294/64.1; 271/90; 414/627; 414/752
(58) Field of Search .................. 294/64.1, 65; 414/627, 414/737, 752; 901/40; 271/5, 20, 90–92, 94, 98, 106, 107

(56) References Cited

U.S. PATENT DOCUMENTS

| | | | | |
|---|---|---|---|---|
| 3,307,869 A | * | 3/1967 | Warfel | 294/64.1 |
| 3,313,568 A | * | 4/1967 | Fogg | 294/64.1 |
| 3,627,369 A | * | 12/1971 | Nixon | 294/64.1 |
| 4,511,386 A | * | 4/1985 | Kellar et al. | 294/64.1 |
| 4,775,290 A | * | 10/1988 | Brown et al. | 294/65 |
| 5,540,795 A | * | 7/1996 | Franklin et al. | 271/91 |

FOREIGN PATENT DOCUMENTS

| | | | | |
|---|---|---|---|---|
| GB | 2028281 | * | 3/1980 | 271/91 |
| SU | 1735187 | * | 5/1992 | 294/64.1 |

* cited by examiner

Primary Examiner—Dean J. Kramer
(74) Attorney, Agent, or Firm—Fish & Associates, LLP; Robert Fish

(57) ABSTRACT

An automated tool that can handle a sheet. The tool may include a flexible membrane that is attached to a frame. The flexible membrane may include a vacuum opening that is adapted to pull the sheet into the membrane. The vacuum opening may pull the outer edges of the sheet out of a tray when the membrane is deflected to a flat position. The tool may then move away from the tray wherein the outer edges of the membrane and sheet are pulled from an adjacent sheet. This effectively "peels" the sheet out of the tray.

13 Claims, 4 Drawing Sheets

VACUUM DEVICE FOR PEELING OFF THIN SHEETS

BACKGROUND OF THE INVENTION

1. Field of the Invention

The present invention relates to a an automatic vacuum chuck that can pick and place a flexible sheet.

2. Background Information

Electronic assemblies sometimes incorporate flexible circuit boards to provide an interconnect between integrated circuits and/or integrated circuit packages. The flexible circuit boards may contain patterned conductive material located on opposite surfaces of a flexible dielectric substrate. It may be desirable to create vias in the dielectric material to connect the conductive material on one side of the dielectric substrate to the conductive material on the other side of the substrate. The vias are typically formed by initially creating holes in the substrate. The substrate is then placed in a plating bath to form the vias.

The dielectric material is typically supported by a worktable during the hole forming process. Each sheet of dielectric material can be automatically loaded onto the worktable from a tray full of dielectric sheets. The sheets are typically moved from the tray to the worktable by an automated vacuum chuck. The vacuum chuck may include a plurality of vacuum openings located within a flat metal surface. The vacuum openings pull an individual sheet out of the tray. The vacuum chuck then moves along a gantry to the worktable. The vacuum is terminated to allow the sheet to be placed onto the worktable.

It has been found that electrostatic forces and residual vacuum between the dielectric sheets may cause more than one sheet to be picked up by the vacuum chuck at a single time. The electrostatic forces may also cause the sheet to become misaligned on the chuck and the worktable. Additionally, the electrostatic forces increase the time required to pick up a sheet and thus reduce the amount of sheets per hour that can be processed. It would be desirable to provide a vacuum chuck that can more readily pick up and release a sheet than chucks of the prior art.

SUMMARY OF THE INVENTION

One embodiment of the present invention is an automated tool that can handle a sheet. The tool may include a flexible membrane that is attached to a frame. The flexible membrane may include a vacuum opening that is adapted to pull the sheet into the membrane.

DETAILED DESCRIPTION

Figure 1:
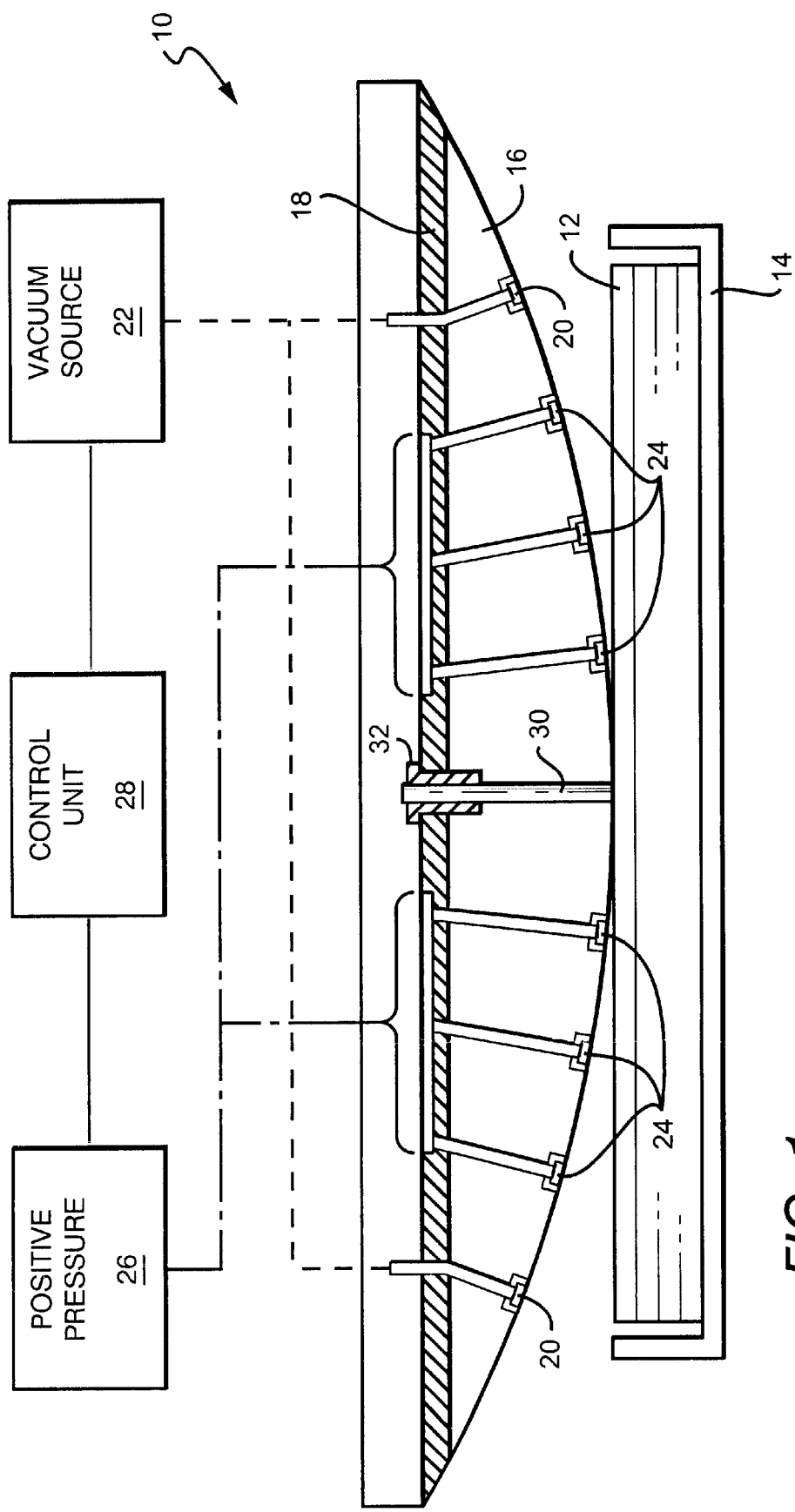
FIG. 1 is a side sectional view of an embodiment of an automatic tool of the present invention.

Referring to the drawings more particularly by reference numbers, FIG. 1 shows an embodiment of an automated tool 10 of the present invention. The automated tool 10 can be used to pick up one of a plurality of sheets 12 located within a tray 14. Each sheet 12 may be a polyimide dielectric material typically used in flexible circuit boards (not shown). Alternatively, each sheet 12 may be a polyester film, a fluoropolymer, a copper foil film, or an epoxy glass film.

The tool 10 may include a flexible membrane 16 that is attached to a frame 18. The membrane 16 may have an outer radius of curvature. The flexible membrane 16 may have a plurality of vacuum openings 20 located at the outer perimeter of the membrane 16. The vacuum openings 20 may be in fluid communication with a vacuum source 22 that creates a vacuum pressure at the openings 20. The membrane 16 may also have a plurality of positive pressure openings 24 that are in fluid communication with a source of positive pressure 26. The positive pressure source 26 may create a positive pressure at the openings 24. The sources 22 and 26 may be controlled by a control unit 28 that can independently turn the vacuum pressure and the positive pressure on and off. By way of example, the vacuum source 22 may be the inlet of a compressor (not shown) and the positive pressure source 26 may be the outlet of the compressor. The control unit 28 may be a computer connected to control valves (not shown) that independently control the flow of air between the openings 20 and 24 and the compressor.

The flexible membrane 16 may be a thin sheet metal or plastic material that can be deflected without yielding the material. As an alternate embodiment, the flexible membrane 16 may be a flexible skin and the openings 20 and 24 may be created by tubes that are attached to the frame 18 and the skin.

The tool 10 may include a guide pin 30 that is attached to the membrane 16 and can slide within a sleeve 32 attached to the frame 18. The pin 30 may assist in insuring the membrane deflects to a flat position.

Figure 2:
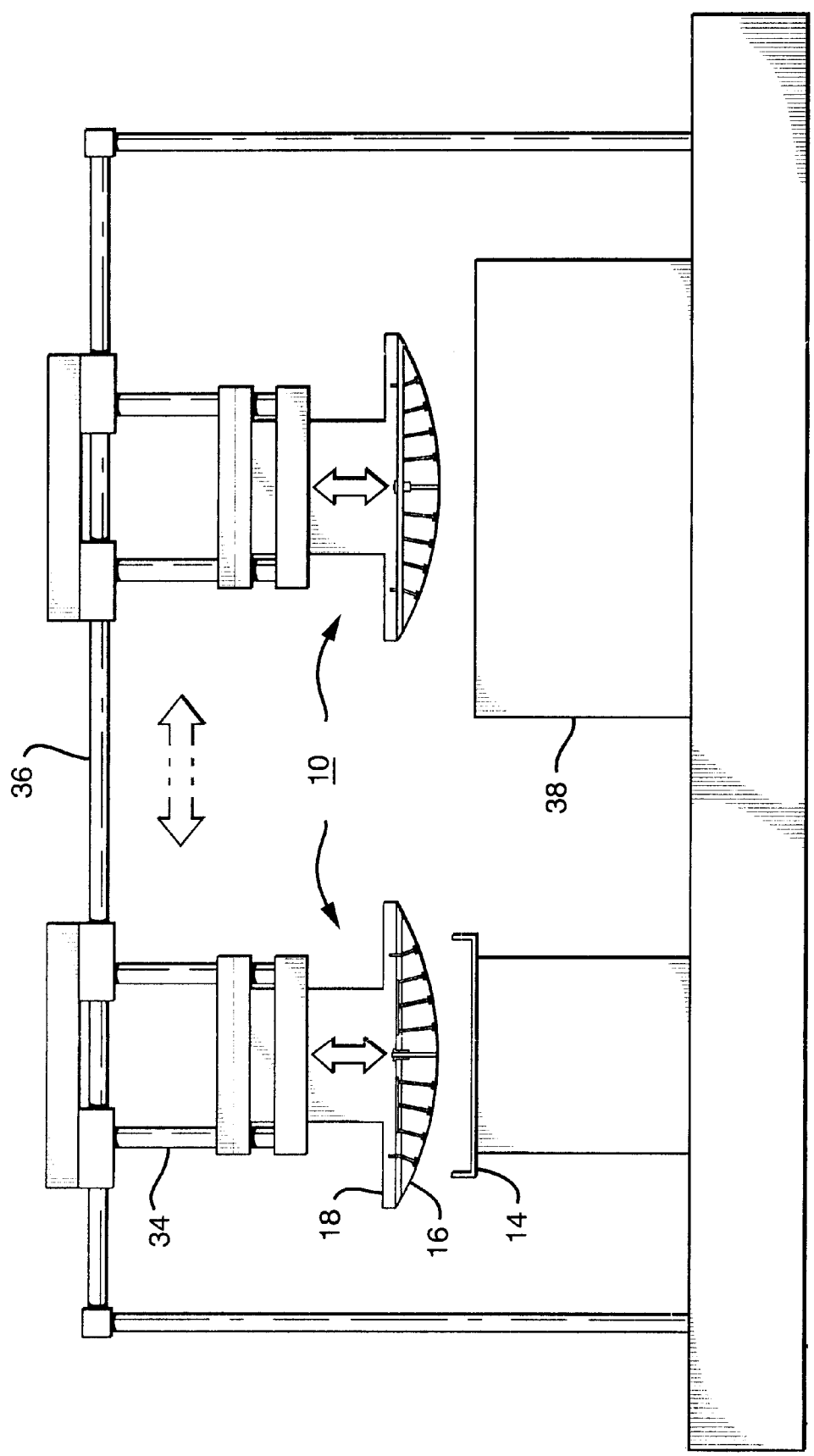
FIG. 2 is a side view showing the automatic tool on a gantry.

As shown in FIG. 2 the tool 10 may include an actuator 34 that is suspended from an automated conveyor gantry 36. The actuator 34 can move the frame 18 and flexible membrane 16 in an upward and downward direction as indicated by the arrows. The gantry 36 can move the tool 10 from the tray 14 to a worktable 38. The worktable 38 may support the sheet 12 while a plurality of holes are being formed therein.

In operation, the gantry 36 moves the tool adjacent to the tray 14. The actuator 34 then moves the flexible membrane 16 into the tray 14 to capture a sheet 12. The actuator 34 moves the membrane 16 out of the tray 14 and the gantry 36 moves the tool 10 adjacent to the worktable 38. The actuator 34 then moves the flexible member 16 so that the sheet 12 can be placed onto the table 38.

Figure 3A:
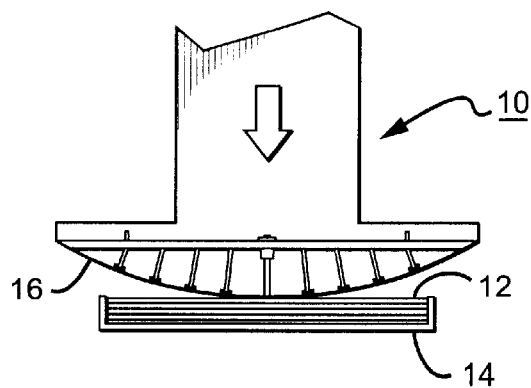
FIGS. 3a–e are side views showing the tool picking up a sheet.
Figure 3D:
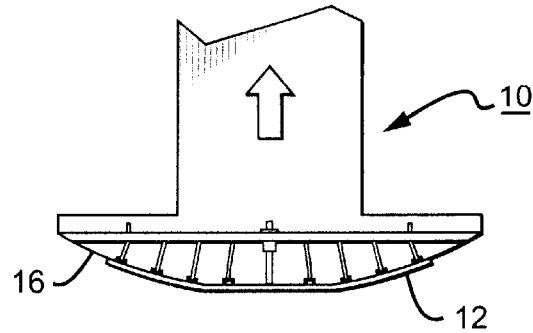
Figure 3B:
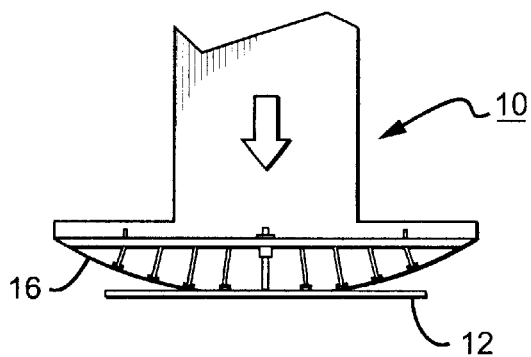
Figure 3E:
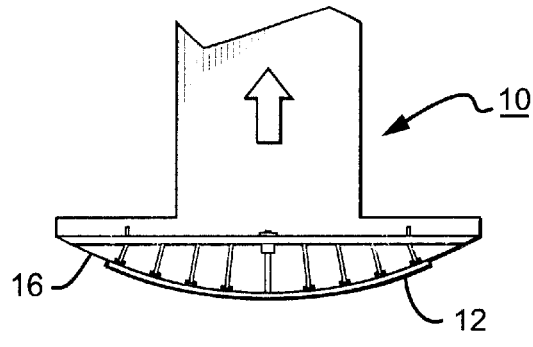
Figure 3C:
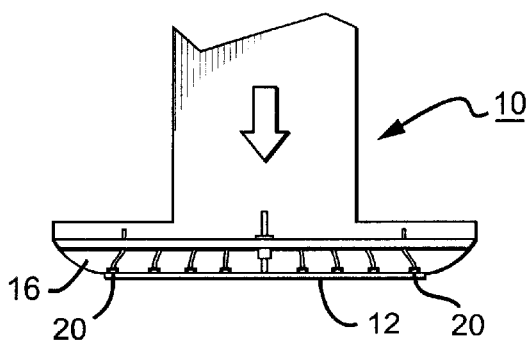
Figure 4A:
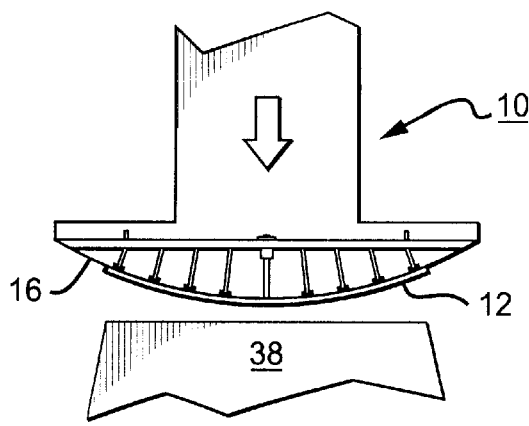
FIGS. 4a–e are side views showing the tool placing the sheet on a worktable
Figure 4B:
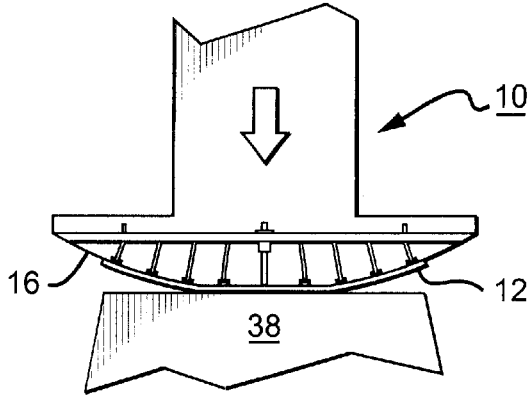
Figure 4C:
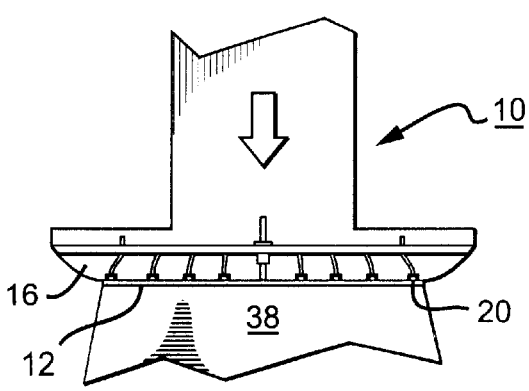
Figure 4D:
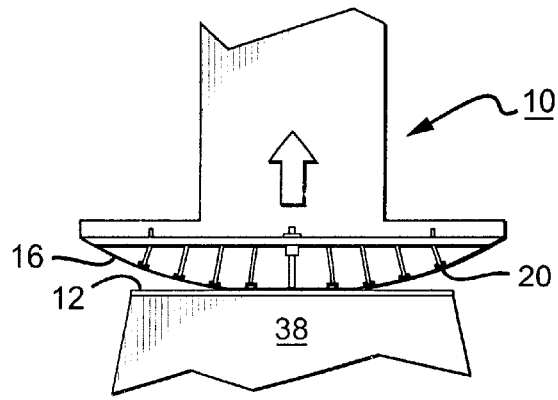
Figure 4E:
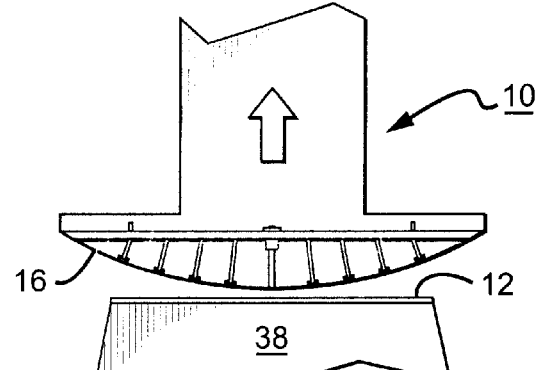

FIGS. 3a–e show a sequence for picking a sheet 12 up out of the tray 14. As shown in FIGS. 3a, 3b and 3c, the tool 10 can move into the tray 14 until the flexible membrane 16 is deflected into a flat position. The control unit may then switch the vacuum control valve so that there is a vacuum pressure at the vacuum openings 20. The vacuum pressure pulls the outer edges of the sheet 12 onto the flexible membrane 16. The tool 10 is then moved away from the tray 14. The flexible membrane 16 expands back to the original shape. The outer edges of the membrane 16 become separated from the tray first thereby lifting the outer edges of the sheet 12 away from the adjacent sheet. This expansion of the flexible membrane 16 has the effect of peeling the sheet 12 out of the tray from the outer edges of the adjacent sheet 12. The peeling action reduces the pulling force required to overcome the electrostatic and residual vacuum forces of the sheets 12. This improves the accuracy of sheet location on the tool 10 and the subsequent placement onto the worktable 38. Additionally, the lower pulling forces reduces the time required to remove the sheet 12 from the tray 14.

FIGS. 4a–e show a sequence for placing a sheet 12 onto the worktable 38. The tool 10 is moved into the table 38 to deflect the flexible membrane 16. The control unit 28 then turns the vacuum off and turns the positive pressure on to push the sheet 12 away from the membrane 16 through the openings 24. This sequence may occur while the membrane 16 is being deflected onto the worktable 38. The worktable 38 typically has a vacuum chuck that holds the sheet 12. The tool 10 is then moved away from the table 38. After holes are formed in the sheet 12 the tool 10 may replace the holed filled sheet with another sheet 12 from the tray 14.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An automatic sheet handling tool for handling a sheet, comprising:
    a frame;
    a flexible membrane deflectable from a first shape to a second shape, having a vacuum opening adapted to pull the sheet onto said flexible membrane while the flexible membrane is deflected into the second shape, and having sufficient resiliency to expand back into the first shape while the sheet is on the flexible membrane; and
    a guide pin attached to said frame and said flexible membrane.

2. The tool of claim 1, wherein said flexible membrane includes a positive pressure opening adapted to push the sheet away from said flexible membrane.

3. The tool of claim 2, further comprising a control unit that controls a vacuum pressure at said vacuum opening and a positive pressure at said positive pressure opening.

4. The tool of claim 1, wherein said flexible membrane has a radius of curvature.

5. The tool of claim 1, further comprising a control unit that controls a vacuum pressure at said vacuum opening.

6. The tool of claim 1, further comprising an actuator that can move said frame and said flexible membrane.

7. The tool of claim 6, further comprising a gantry that supports said actuator, said frame and said flexible membrane.

8. The tool of claim 1, wherein said vacuum opening is located at an outer perimeter of said flexible membrane.

9. A method for picking up a sheet, comprising:
    moving a tool until a flexible membrane of the tool engages the sheet, and a vacuum airflow pulls the sheet onto the flexible membrane causing the sheet to conform to the shape of the flexible membrane; and
    changing the shape of the flexible membrane, the vacuum airflow maintaining the sheet in contact with the flexible membrane such that the sheet continues to conform to the changing shape of the flexible membrane;
    wherein the tool is moved into the sheet until the flexible membrane is deflected.

10. The method of claim 9, wherein the vacuum airflow to pull the sheet into the flexible membrane is created after the flexible membrane is deflected.

11. The method of claim 10, herein the vacuum airflow pulls an outer edge of the sheet onto the flexible membrane.

12. A method for placing a sheet onto a working surface, comprising:
    moving a tool adjacent to the working surface, the tool having a flexible membrane and a vacuum opening that pulls the sheet into the flexible membrane;
    terminating a vacuum pressure of the vacuum opening to release the sheet from the flexible membrane; and,
    the flexible membrane is deflected before the vacuum pressure is terminated.

13. The method of claim 12, further comprising the step of generating a positive pressure to push the sheet away from the flexible membrane.

* * * * *